(12) United States Patent
Riu (10) Patent No.: US 8,257,211 B2
(45) Date of Patent: *Sep. 4, 2012

(54) PULLEY ASSEMBLY

(75) Inventor: Hervé Riu, La Murette (FR)

(73) Assignee: Dayco Europe S.R.L., Chieti (IT)

( * ) Notice: Subject to any disclaimer, the term of this patent is extended or adjusted under 35 U.S.C. 154(b) by 460 days.

This patent is subject to a terminal disclaimer.

(21) Appl. No.: 12/309,070

(22) PCT Filed: Jul. 7, 2006

(86) PCT No.: PCT/IT2006/000518
§ 371 (c)(1),
(2), (4) Date: May 29, 2009

(87) PCT Pub. No.: WO2008/004257
PCT Pub. Date: Jan. 10, 2008

(65) Prior Publication Data
US 2010/0029422 A1    Feb. 4, 2010

(51) Int. Cl.
*F16D 3/00*    (2006.01)
*F16D 7/00*    (2006.01)
*F16H 55/14*   (2006.01)
*F16H 55/36*   (2006.01)
*F16H 55/12*   (2006.01)
*F16H 7/12*    (2006.01)
*F16F 15/121*  (2006.01)

(52) U.S. Cl. .......... 474/94; 474/163; 474/902; 474/133; 464/61.1; 464/62.1; 192/55.2

(58) Field of Classification Search .................. 474/94, 474/163, 166, 259, 902, 133, 135; 464/51, 464/61.1, 62.1; 192/41 R, 55.2, 56.2, 212.77, 192/75, 207, 55.5, 55.51

See application file for complete search history.

(56) References Cited

U.S. PATENT DOCUMENTS

| 1,126,031 | A | * | 1/1915 | Kirchner | 152/96 |
| 4,103,516 | A | * | 8/1978 | Marcin | 198/781.02 |
| 5,462,494 | A | * | 10/1995 | Rogalla | 474/135 |
| 5,908,095 | A | * | 6/1999 | Jackel et al. | 192/70.17 |
| 6,083,130 | A | * | 7/2000 | Mevissen et al. | 474/70 |
| 6,819,550 | B2 | * | 11/2004 | Brownell, Jr. et al. | 361/679.22 |
| 2003/0199348 | A1 | * | 10/2003 | Huber | 474/94 |
| 2004/0014540 | A1 | * | 1/2004 | Dell et al. | 474/70 |
| 2005/0081463 | A1 | * | 4/2005 | Allen et al. | 52/204.1 |
| 2005/0178637 | A1 | * | 8/2005 | Tsuchiya et al. | 192/105 CD |
| 2006/0035740 | A1 | * | 2/2006 | Lehtovaara et al. | 474/237 |

FOREIGN PATENT DOCUMENTS

DE    4407157 A1 *  9/1995
EP    1279807 A1 *  1/2003

* cited by examiner

*Primary Examiner* — Michael Mansen
*Assistant Examiner* — Minh Truong
(74) *Attorney, Agent, or Firm* — Davidson Berquist Jackson & Gowdey, LLP (57) ABSTRACT

A pulley assembly for a flexible motor vehicle transmission, comprising a supporting member rotatable about an axis, a pulley adapted to cooperate with a belt and connected to the supporting member to be rotatable about said axis with respect to the supporting member, elastic spiral means interposed between the supporting element and the pulley and comprising a sliding portion elastically loaded in radial direction against a sliding wall carried by one of either the supporting members or the pulley for tangential force drive coupling pulley to the supporting member. In particular, the elastic spiral means comprise a supporting element and sliding portion comprising at least one runner carried by the supporting element and sliding along the sliding walls.

22 Claims, 5 Drawing Sheets

FIG. 10

PULLEY ASSEMBLY

TECHNICAL FIELD

The present invention relates to a pulley assembly, particularly for a driving belt, adapted to connect a plurality of accessory members to a driving shaft of an internal combustion engine.

BACKGROUND ART

Pulley assemblies comprising a hub adapted to be rigidly connected to a crankshaft of an internal combustion engine and a pulley adapted to cooperate with a belt of the accessory drive and rotationally connected to the hub by means of a spiral spring are known.

Such known assemblies also generally comprise an integrated torsional damper, which consists of an coaxial annular seismic mass at the hub and an elastic connection element arranged between the hub and the seismic mass.

In use, the spiral spring couples the hub and the pulley with the rotation and presents a relatively low stiffness so as to allow to filter the torsional vibrations of the driving shaft and avoid such vibrations from being transmitted to the accessory drive.

In the known pulley assemblies, the pulley is connected radially to the hub and comprises a sliding wall defining a central cavity for accommodating a portion of the hub and the spiral spring. The spiral spring comprises a first end portion connected rigidly to the hub and a second end portion fitted with radial interference against the sliding wall.

During operation, the pulley may be in advance of the hub and the second end portion may slip relatively to the sliding wall when a maximum transmissible torque value is exceeded. Such condition occurs during cranking of the engine when there are considerable fluctuations in torque, or during the instants immediately following a sudden deceleration when the crankshaft turns at a relatively slow angular speed while the accessory drive proceeds by inertia at a higher angular speed.

In operating conditions in which the pulley tends to in advance of the hub, the second end portion slides on the sliding wall. In particular, the spiral spring is generally made of harder material with respect to that of the sliding wall and the consequent wear may reduce the useful life of the pulley assembly.

DISCLOSURE OF INVENTION

The object of the present invention is to make a pulley assembly free from the aforementioned drawback.

The object of the present invention is achieved by a pulley assembly as described herein.

BRIEF DESCRIPTION OF THE DRAWINGS

For a better understanding of the present invention, it will now be described a preferred embodiment only by way of non-limitative example, and with reference to the accompanying drawings, in which.

BEST MODE FOR CARRYING OUT THE INVENTION

Figure 1:
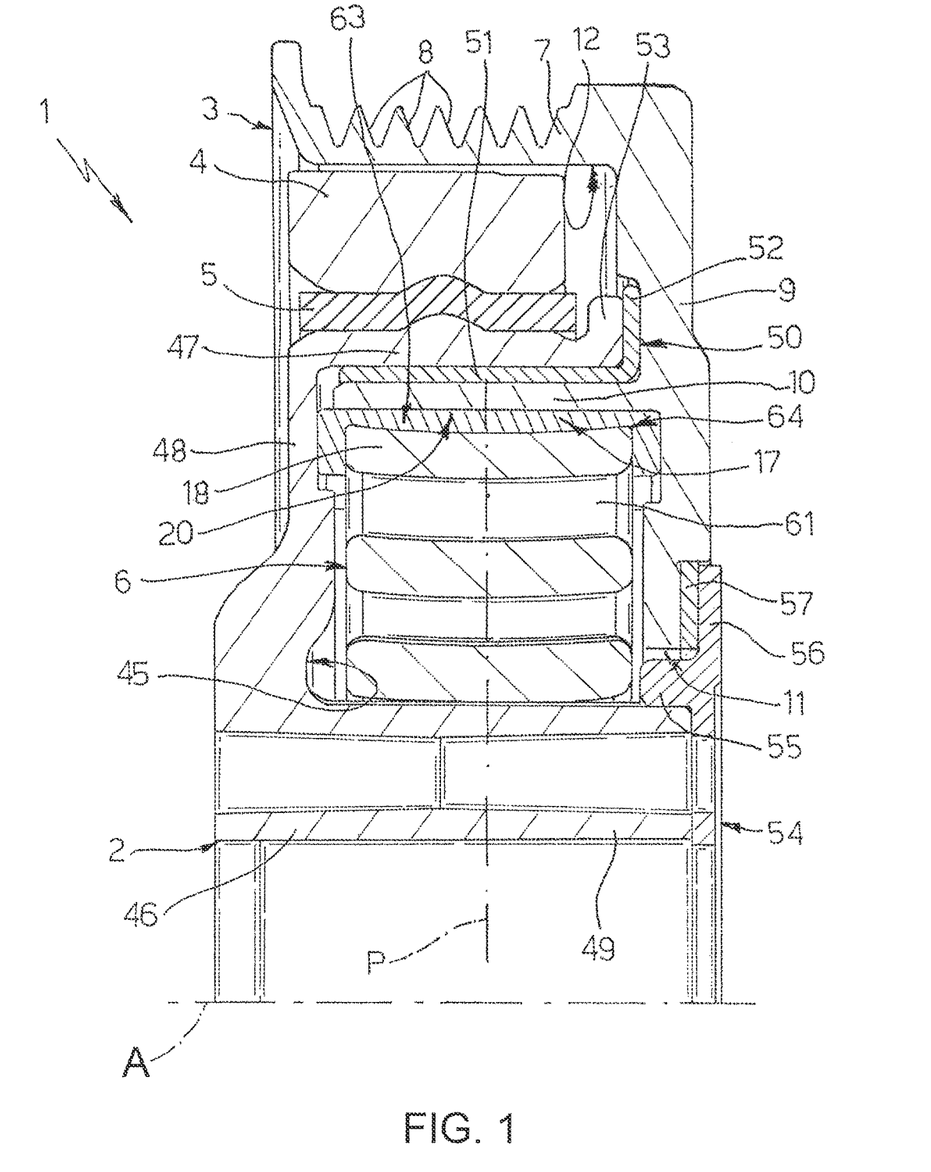
FIG. 1 is a radial section of a pulley assembly according to the present invention.

In FIG. 1, number 1 indicates as a whole a pulley assembly comprising a hub 2 adapted to be rigidly connected to a crankshaft of an internal combustion engine, a pulley 3 radially supported by hub 2, a seismic mass 4 connected to hub 2 by means of a band 5 of elastomeric material for defining a torsional vibration dynamic damper, and a spiral spring 6 for rotationally connecting hub 2 to pulley 3.

In particular, hub 2 defines an annular cavity 45 and integrally comprises a tubular element 46 having an axis A, a side wall 48 radially protruding from tubular element 46 and a cylindrical wall 47 radially external to tubular element 46.

Pulley 3 is preferably made as a single part and comprises a crown 7 coaxial to axis A and defining a plurality of grooves 8 adapted to cooperate with a belt (not shown) of an accessory drive, a side wall 9 perpendicular to axis A and protruding from a side of crown 7 towards axis A, and a cylindrical wall 10 protruding from side wall 9 under crown 7 and having a diameter smaller than that of cylindrical wall 47 of hub 2.

Furthermore, side wall 9 defines a circular opening 11 having a diameter smaller than that of cylindrical wall 10.

Pulley 3 is fitted on hub 2 so that side wall 9 axially closes annular cavity 45 and that cylindrical wall 47 radially surrounds cylindrical wall 10.

In particular, it is envisaged a bushing 50 inserted in annular cavity 45 between cylindrical walls 10 and 47 to radially support pulley 3 onto hub 2. Bushing 50 presents a cross L-section and integrally comprises a cylindrical portion 51 radially inserted between cylindrical walls 10, 47 and a flange portion 52 axially inserted between side wall 9 and abutting portion 53 radially protruding from a free end portion of cylindrical wall 47.

To axially secure pulley 3 and hub 2, an end portion 49 of tubular element 46 crosses circular opening 11 and pulley assembly 1 comprises an essentially flat retaining ring 54 bolted to end portion 49. When retaining ring 54 is fitted onto tubular element 46, pulley 3 is closed against flange portion 52 of bushing 50 and abutting portion 53 of hub 2 so as to recover the axial play and allow the relative rotation of hub 2.

In particular, retaining ring 54 integrally comprises an axial annular ridge 55 which defines a centering seat for connecting to tubular element 46 and a peripheral portion 56 facing side wall 9. Furthermore, it is envisaged a ring 57 of anti-friction material axially interposed between peripheral portion 56 and side wall 9. Furthermore, ring 57 is also accommodated in a specific seat defined by side wall 9 to prevent possible deposits from depositing between ring 57 and the respective contact surfaces defined by side wall 9 and retaining ring 54.

When pulley 3 is fitted on hub 2, cylindrical wall 47, crown 7 and a portion of side wall 9 delimit an annular cavity 12 for at least partially accommodating seismic mass 4 and band 5. Furthermore, annular cavity 12 surrounds annular cavity 45 which radially accommodates spring 6.

Spring 6, generally made of harder material with respect to that used to make cylindrical wall 10, comprises a spiral section 14 (FIG. 2), an end portion 15 radially internal to spiral portion 14 and rigidly connected to hub 2, and a sliding portion 16 radially external with respect to spiral portion 14 and cooperating with cylindrical wall 10.

Figure 2:
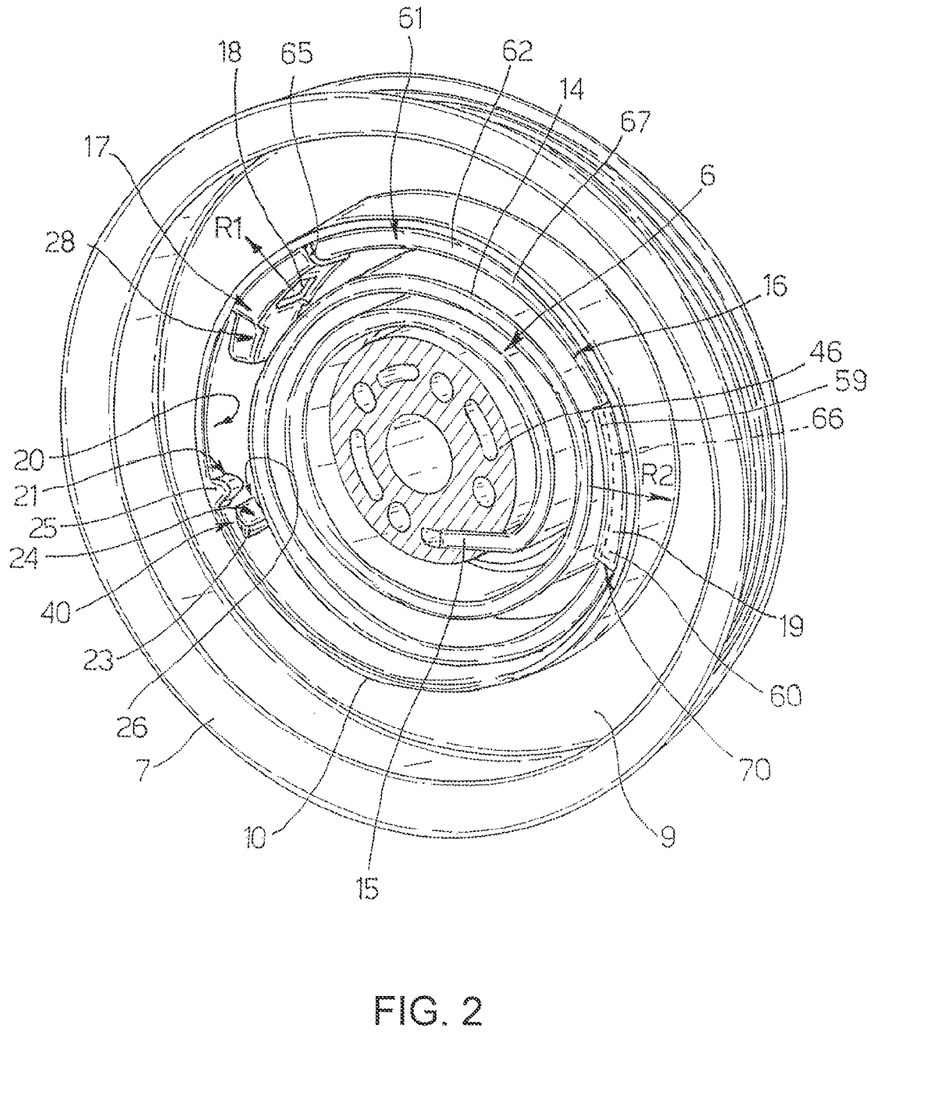
FIG. 2 is a perspective view of the pulley assembly in FIG. 1 with cut-away or cut-out components for clarity.

Preferably, spring 6 is connected to hub 2 non exclusively by friction. For example, end portion 15 is radially folded towards axis A and inserted in a groove defined by hub 2. Other possible couplings are a coupling by means of a stiff fastening element, such as a pin, or a shape coupling.

Furthermore, sliding portion 16 presents a median plane P perpendicular to axis A and comprises a supporting portion 61 integral with spiral portion 14, a runner 17 connected rigidly to a free end portion 18 of supporting portion 61 and a runner 19 connected rigidly to a portion 66 of sliding portion 16 in a position distanced from runner 17 in tangential direction. The supporting portion 61 also presents an intermediate portion 67 radially distanced from cylindrical wall 10 and tangentially interposed between free end portion 18 and portion 66.

Spring 6 is fitted with radial interference within annular cavity 45 and runners 17, 19 are preloaded by the radial push of spiral portion 14 against sliding surface 20 defined by cylindrical wall 10 and facing axis A.

Pulley assembly 1 also comprises a stop 21 for locking the slip of sliding portion 16 along cylindrical wall 10.

Stop device 21 comprises runner 17 and a pair of abutting elements 25 radially protruding from cylindrical wall 10 and axially spaced to delimit a hollow 26.

Preferably, the abutting elements 25 form a single part with cylindrical wall 10.

According to a preferred embodiment, pulley assembly 1 also comprises a damping device 40 to dissipate at least part of the kinetic energy due to the relative speed between hub 2 and pulley 3. Damping device 40 comprises runner 17 and a wedge 23 arranged on opposite tangential side of runner 17 with respect to abutting elements 25. Furthermore, wedge 23 defines an inclined surface 24 facing hollow 26 and arranged symmetrically to the median plane of hollow 26.

Figure 3:
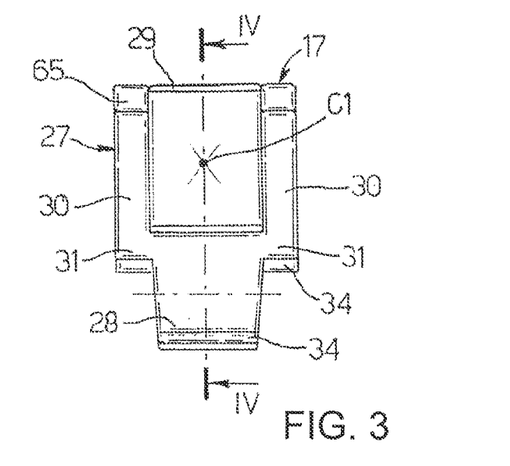
FIG. 3 is a bottom view of a component in the pulley assembly of FIG. 1.
Figure 4:
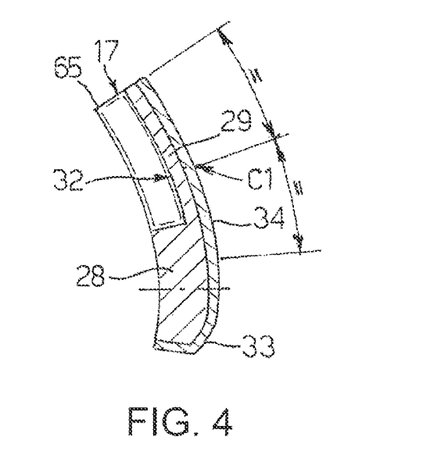
FIG. 4 is a section of FIG. 3 taken along line IV-IV in FIG. 3.
Figure 5:
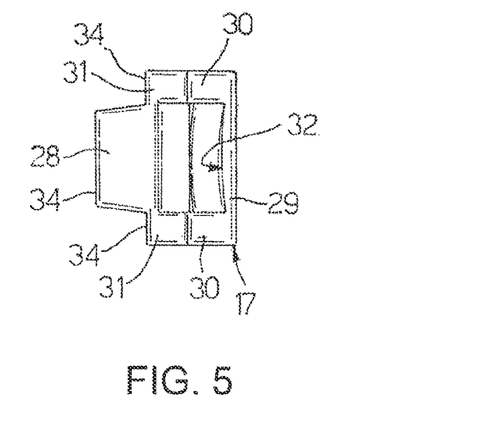
FIG. 5 is a rear view of FIG. 3.

FIGS. 3-5 show runner 17 which integrally comprises an anchoring portion 27 connected to free end portion 18 and a head portion 28 protruding from anchoring portion 27 along the tangential direction.

The width of anchoring portion 27 is wider than that of supporting portion 61 and comprises a covering wall 29 radially interposed between cylindrical wall 10 and free end portion 18 and a pair of side walls 30 protruding from covering wall 29 to cover respective sides 62 of free end portion 18.

Side walls 30 delimit a resting surface 32 defined by covering wall 29 and arranged in contact with a back 63 of supporting portion 61. Resting surface 32 presents, along the direction of axis A, convex generating lines at least in its central part. The radius of curvature of the generating lines of resting surface 32 is essentially equal to the anticlastic radius of curvature of the generating lines of back 63 and in particular to the radius of curvature of a central symmetric segment with respect to plane P of back 63.

As shown in FIG. 4, covering wall 29 follows a circumferential arch profile concentric to axis A and presents a thickness essentially constant on a plane perpendicular to axis A.

Anchoring portion 27 also comprises respective abutting walls 31 arranged perpendicularly both to side walls 30 and to covering wall 29.

Head portion 28 protrudes along the profile of covering wall 29 between abutting walls 31 and presents a width so as to engage with clearance in hollow 26.

Furthermore, head portion 28 defines a chamfer 33 facing slipping surface 20 and selectively cooperating with inclined surface 24.

Preferably, at least anchoring portion 27 is made by sintering from metallic powders and the covering wall 29 is coated by a layer 34 of polymeric material directly in contact with the sliding surface 20. Preferably, also abutting walls 31 and head portion 28 are coated with layer 34.

For example, the polymeric material comprises an epoxy resin preferably added with a fluorinated plastomer.

Runner 19 (FIGS. 6-8) also comprises a covering wall 35 defining a convex surface 36 functionally similar to resting surface 32, a layer 34 of polymeric material having a constant thickness carried by the covering wall 35, and a pair of side walls 37 functionally similar to side walls 30.

Figure 6:
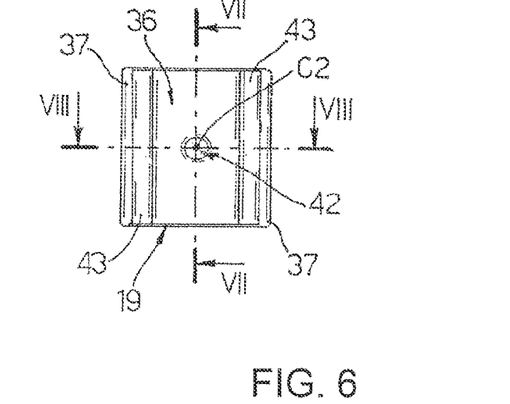
FIG. 6 is a bottom view of a second component in the pulley assembly according to the present invention.
Figure 7:
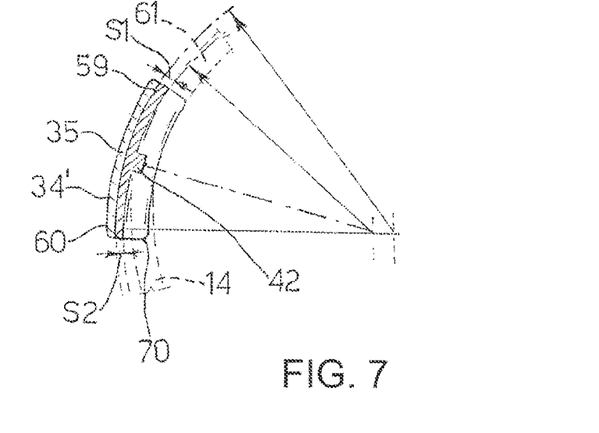
FIG. 7 is a section of FIG. 6 taken along line VII-VII in FIG. 6.
Figure 8:
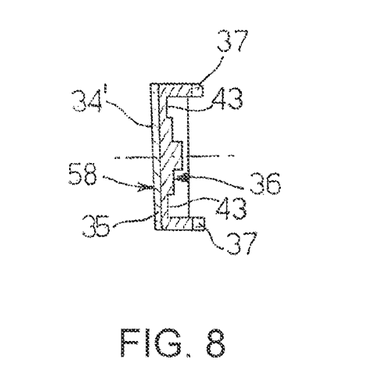
FIG. 8 is a section taken along line VIII-VIII in FIG. 7

Preferably, covering wall 35 presents a back surface 58 having a cylindrical profile coaxial to axis A and a variable thickness along the tangential direction to make the contact pressure distribution uniform.

In particular, thickness S1 of a proximal portion 59 of covering wall 35 facing runner 17 is higher than thickness S2 of a distal portion 60 of covering wall 35 arranged on the tangentially opposite side of runner 17 with respect to proximal portion 59. In particular, the thickness continuously increases from distal portion 60 towards proximal portion 59.

According to the embodiment shown in FIG. 7, the thickness variation of covering wall 35 is obtained because the convex surface 36 presents in section along the plane P a circumferential radius profile having a radius smaller than that of back surface 58 and a center specifically arranged for this purpose.

Furthermore, covering wall 35 comprises a projection 42 centrally protruding from the same side as side walls 37. In use, the projection couples with a hole, possibly blank, made on back 63 of supporting portion 61 to obtain a rigid connection for shape coupling in tangential direction.

Furthermore, covering wall 35 defines a pair of relieves 43 arranged parallel to side walls 37 and delimiting convex surface 36. Relieves 43, possibly also present on runner 17, allow to receive the generally irregular edge 64 of sides 62 of spring 6.

The operation of pulley assembly 1 is as follows.

When the crankshaft turns the accessory drive, hub 2 drives pulley 3 and transfers a positive torque which acts to approach runner 17 to abutting elements 25. Consequently, abutting walls 31 of runner 17 are against respective abutting elements 25 and sliding portion 16 is a stop portion.

In particular, it is important that runner 17 cannot exceed the abutting elements 25 at any positive torque running or design value. One way of obtaining such effect is to orient the contact surfaces between abutting walls 31 and abutting elements 25 so that the value of a possible force component parallel to the contact surfaces and directed towards hub 2 is negligible with respect to the friction force acting on the contact surfaces. For example, the contact surfaces may be essentially parallel to the radial direction.

When hub 2 feeds pulley 3, spiral portion 14 of spring 6 tends to unwind and supporting portion 61 completely adheres to resting surface 32 by effect of the transmitted torque.

In such a condition, the static torque transmitted between hub 2 and pulley 3 is proportional to the relative angular position between hub 2 and pulley 3.

In particular, covering wall 35 is subject to a distribution of radial pressures with is the sum of the two supplies. The first supply relates to the action of spiral portion 14 and is mostly concentrated at distal portion 60. The second supply is due to the radial deflection of the supporting portion 61 by effect of the increasing thickness of covering wall 35. In particular, proximal portion 59 presents a thickness S1 increasing with respect to thickness S2 of portion 60 and therefore induces a deflexion of wall 61. The effect of such deflexion tends to concentrate at proximal portion 59 and the variation of thickness is calculated so that the sum of the two radial supplies is essentially constant along the tangential direction of the radial pressures when hub 2 feeds pulley 3 and spiral portion 14 is under load.

During operation, when hub 2 drags pulley 3, the spiral portion 14 filters the torsional vibrations transmitted to hub 2 by the crankshaft while runner 17 always remains against the abutting elements 25 thanks to the radial preload of sliding portion 16 against cylindrical wall 10.

In the case of sudden deceleration, the inertia of the accessory transmission transfers a negative torque to pulley assembly 1 which distances runner 17 from abutting elements 25.

In particular, the threshold of such torque is higher than the torque transmissible by friction between sliding portion 16 and cylindrical wall 10. Such threshold depends on the friction coefficient between runners 17, 19 and sliding surface and on the radial preload of sliding portion 16 against cylindrical wall 10.

Under the bias of a negative torque higher than the threshold value, runner 17 is separated from abutting elements 25 and in this way produces a joint in advance effect because sliding portion 16 slips on cylindrical wall 10 and is guided in axial direction by respective side walls 30, 37 which cooperate with side walls 9, 48.

When runner 19 slips on sliding surface 20, the rotation of pulley 3 depends on the angular position of hub 2 because the force of attraction exerted by sliding portion 16 while sliding is essentially independent on the angular relative position between hub 2 and pulley 3.

Furthermore, in negative torque condition, spiral portion 14 tends to wind and the radial pressure distribution along covering wall 35 is not constant in tangential direction but is concentrated at proximal portion 59. However, the absolute value of the contact radial pressure when spiral portion 14 is wound is lower than that previously described in which spiral portion 14 is wound and therefore it less severely stresses proximal portion 59.

When the motor accelerates again, hub 2 tends to be in advance of pulley 3 and sliding portion 16 slips on sliding surface 20 towards abutting elements 25 once the average value of the torque transmitted by the crankshaft exceeds the threshold torque. At the same time, spiral portion 14 is unwound and supporting portion 61 fully adheres to convex surface 36.

In particular, before runner 17 abuts against abutting elements 25, chamfer 33 slips on the inclined surface 24 and induces an increase of the radial force exerted by runner 17 on inclined surface 24. Consequently, the friction force increases and in this way damping device 40 tends to decrease the relative speed between hub 2 and pulley 3 and to dissipate by friction the kinetic energy to attenuate the impact against abutting elements 25.

Furthermore, runners 17, 19 are distanced in tangential direction so that the total resultant of the radial forces exerted by spring 6 on pulley 3 by means of runners 17, 19 is reduced. In particular, the total resultant is the sum of the partial resultants R1, R2 acting respectively at runner 17 and runner 19 and the total resultant is minimal when the partial resultants are distanced by 180°. Such effect is reached because pressure is concentrated on runners 17, 19 with respect to intermediate portion 67, which is radially spaced from the sliding surface 20 along an arch which reciprocally separates runners 17, 19

The angular distance of the partial resultants R1, R2 may vary respect to 180° value and it will suffice to be comprised from 150° to 210° to obtain advantageous reduced values of the total resultant of radial forces. A method for having an indication about the angular distance between R1 and R2 is to consider homologous points C1, C2 of respective runners 17, 19. For example, homologous points C1 and C2 may be the centers of respective theoretical contact areas defined on runners 17, 19 or the respective ends 65, 70 of runners 17, 19. In the present embodiment, the theoretical contact areas are defined by the entire curved surface having a rectangular plane development of layer 34' of runner 19 and, on layer 34 of runner 17, by the curved surface having a rectangular plane development delimited between end 65 and abutting portions 31.

The advantages that the present pulley assembly allow to obtain are the following.

The presence of runners 17, 19 allows to control wear of the cylindrical wall 10, which is generally made of a softer material than that used to make spring 6.

The fact that the radiuses of curvature on a plane containing axis A of back 63, and those of the resting walls 31 and convex surface 36 are equal, allows a uniform and essentially symmetric distribution with respect to the median plane P of the radial pressure exerted by supporting portion 61. In this way, torques acting on a plane parallel to axis A are avoided.

A better distribution of the contact pressures and a consequent lower wear of runners 17, 19 is also obtained by means of the variable thickness of covering wall 35 and by means of relieves or recesses 43. In particular, relieves 43 compensate the high irregularities of edges 64.

The manufacturing of anchoring portion 27 and abutting walls 31 by sintering allows to reach high mechanical shock-resistance features.

Side walls 30, 37 prevent supporting portion 61 from coming directly into contact with side wall 9 and damaging it.

The use of a damping device acting when a stop position is reached allows to decrease the noise and stress on runners 17, 19.

The fact that the contact zones, i.e. runners 17, 19, in which the contact pressure is concentrated, are distanced in tangential direction, allows to obtain the effect that the vectorial sum of the respective resultants R1, R2 is lower than the sum of the modules of R1 and R2 by a factor which varies by the square root of the cosine of the angle comprised between resultants R1, R2 according to Carrot's theorem. The radial stress on bushing 50 is therefore decreased.

Furthermore, the fact that runners 17, 19 are spaced in tangential direction, allows to determine a constraint condition for spiral portion 14 similar to an ideal joint and therefore it allows to reduce internal tensions in spiral portion 14 itself.

It is finally apparent that changes and variations can be made to pulley assembly 1 described and illustrated without departing from the scope of protection of the present invention, as defined by the accompanying claims.

Sliding portion 16 may be differently configured. For example, intermediate portion 67 may also be coated with a contact layer in use with cylindrical wall 10 and possibly comprising runners 17, 19 for forming a single covering layer. In this case, free end portion 18 and portion 66 may present a higher radius of curvature with respect to the radius of sliding surface 20 of cylindrical wall 10 when spring 6 is in a relieved condition before assembly. In this way, when spring 6 is fitted, the distribution of pressures is concentrated at free end portion 18 and at portion 66. In particular, at free end portion 18 and portion 66 the pressure presents relative peak values equal to L1 and L2 higher than peak value L3 present at the intermediate portion 67 even if the intermediate portion 67 is in contact with the sliding portion 20.

Advantageously, such contact pressure distribution equally allows to obtain a resultant of the radial forces having a low value.

Runners 17, 19, may be connected to supporting portion 61 by means of a layer of adhesive material (shown by the dark line in FIG. 1 between 17 and 18) and may not be provided with protrusions which define shape coupling. For example, they may simply consist of a glued layer.

Alternatively, at least one of runners 17, 19, and preferably runner 19, may be co-moulded directly onto supporting portion 61.

Alternatively, in an embodiment in which runner 17 is co-moulded, the geometric features required by stop device 21 and/or by damping device 40, for example chamfer 33, are made directly on free end portion 18 of supporting portion 61.

Preferably, when runner 17, 19 is co-moulded, it is made of fibre-reinforced polymeric matrix composite material, for example carbon fibre, and comprising an anti-friction material, for example fluorinated polymer.

According to a further embodiment, at least one of the runners 17, 19 presents a pair of protrusions protruding from respective side walls. The protuberances are accommodated in corresponding hollows made on sides 62 of the supporting portion 61 to define a rigid connection for shape coupling in tangential direction.

Furthermore, a stop device different from that described may be envisaged. In particular, a stop device comprising a groove delimited in tangential direction by respective abutting surfaces and made in the side wall 9 of pulley 3 within the annular cavity 45 may be envisaged. Such groove accommodates one of the side walls 30, 37 of runner 17, 19 which is locked when it cooperates with one of the abutting surfaces.

Also damping device may differ from that described. In particular, an appropriately shaped ridge to define both the stop position and the inclined surface needed to dampen the relative kinetic energy between hub 2 and pulley 3 may be envisaged.

In particular, the shaped ridge defines an abutting surface arranged radially and a curved surface to join sliding surface 20 to the abutting surface.

When pulley 3 comprises the previously described shaped ridge, sliding portion 16 may comprise a co-moulded runner 17. In this case, free end portion 18 defines a chamfer similar to chamfer 33 and cooperating on the curved surface to obtain the damping effect. Free end portion 18 also defines a head portion appropriately joined to chamfer and cooperating against abutting surface of the ridge to define the stop position of sliding portion 16. The head portion either may be covered by a layer or there may be direct contact between the metal of the head portion and the metal of the shaped ridge.

Figure 10:
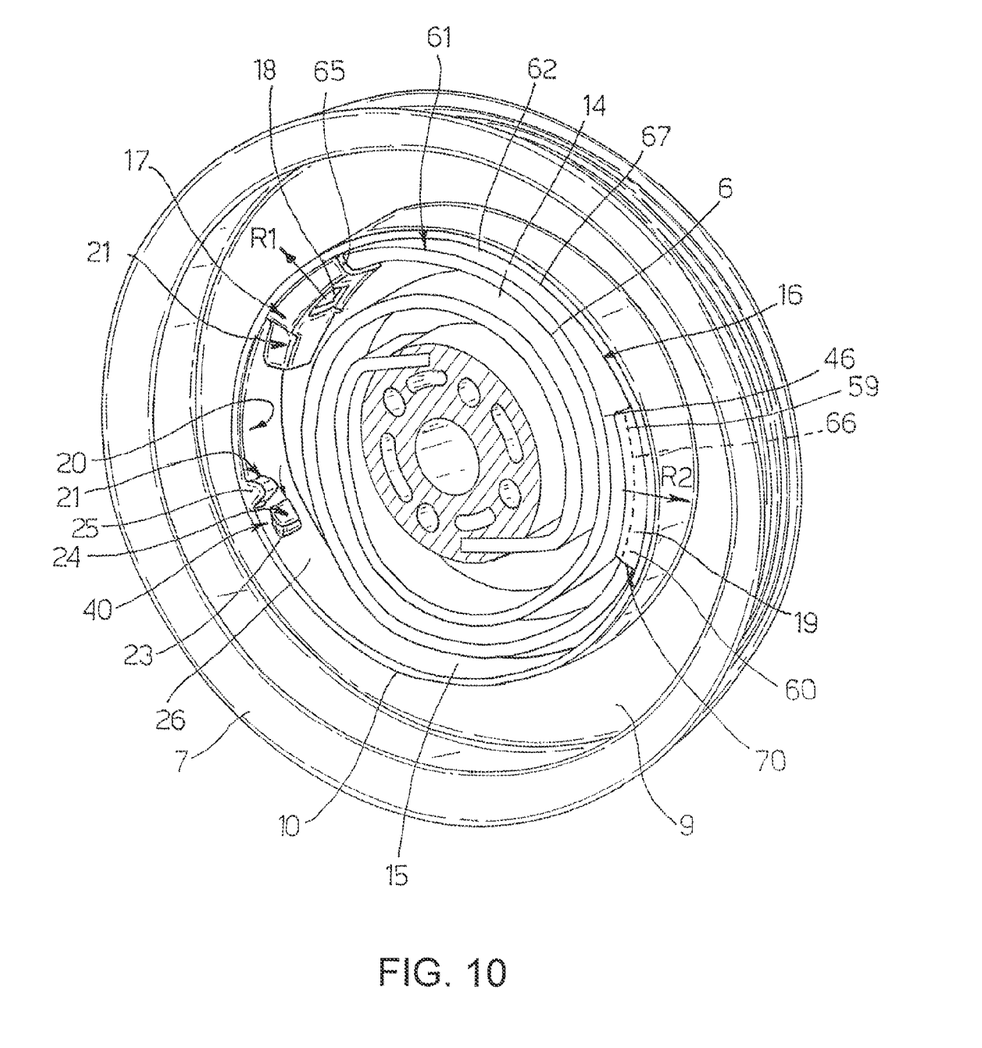
FIG. 10 shows use of a plurality of elastic members.

A plurality of spiral springs 6A and 6B in FIG. 11, arranged angularly and equally spaced, each comprising at least one runner 17, 19 may be envisaged. In this case, the resultant of the radial forces acting on pulley 3 is null with an evident decrease of stress on bushing 50.

Figure 9:
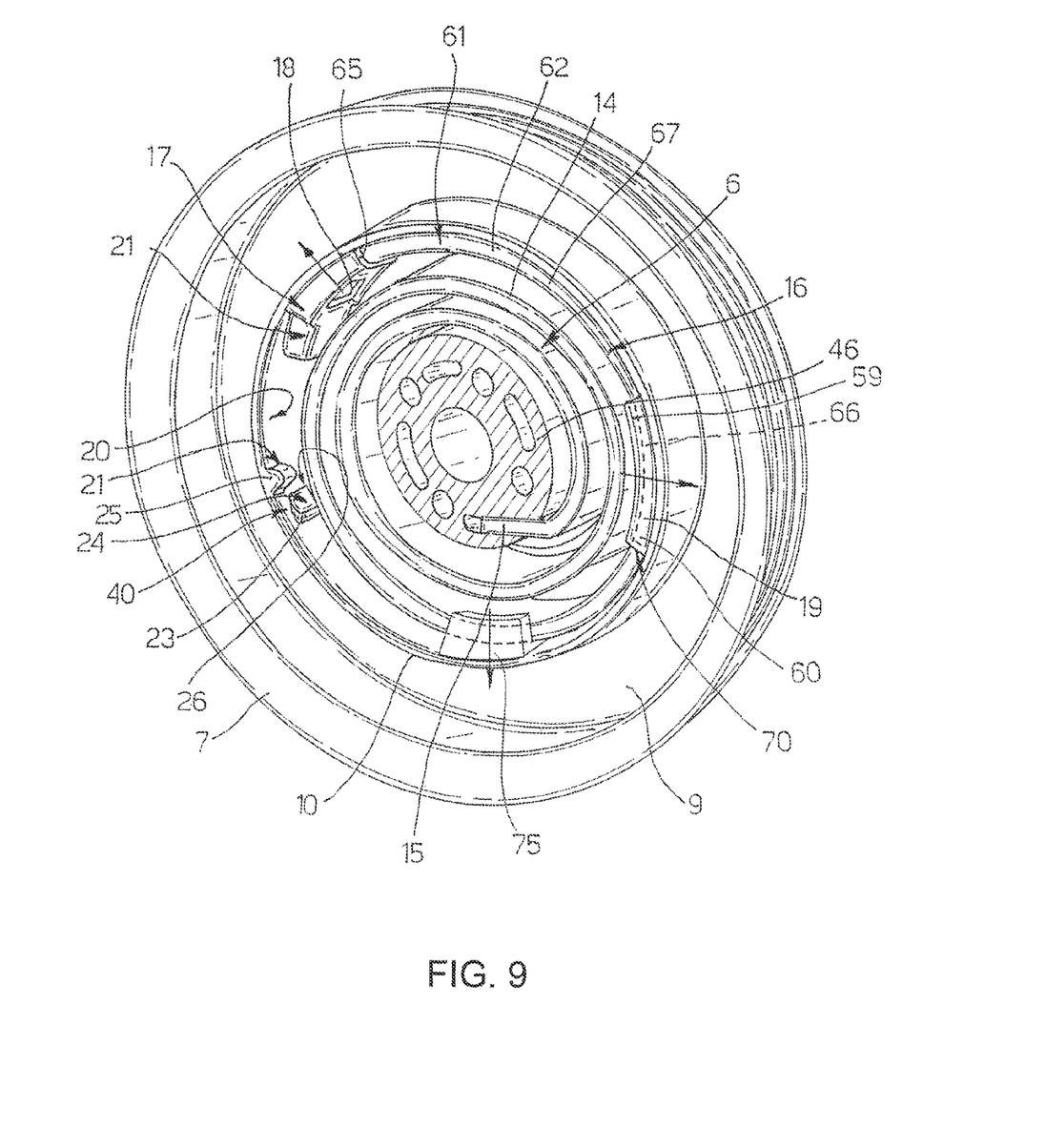
FIG. 9 is a perspective view of another embodiment of the pulley assembly showing the third runner.

Sliding portion 16 may also comprise a third runner 75 angularly and equally spaced from runners 17, 19 and preferably arranged so that the comprised angles are approximately 120°. The presence of a third runner allows higher stability of the sliding portion 16 with respect to movements in direction parallel to axis A. Furthermore, if the angles are 120°, the effect according to which the resultant of the radial forces are essentially null is preserved.

In a simplified construction, pulley assembly 1 may not be provided with stop device 21, and in the stop position, sliding portion 16 and pulley 3 may be coupled only by friction between sliding portion 16 and cylindrical wall 10. In this case, the layer in contact with sliding surface 20 may be made of friction material, such as for example, brake lining.

The invention claimed is:

1. A pulley assembly for a flexible motor vehicle transmission, comprising a supporting member in the form of a hub that is rotatable about an axis (A), a pulley adapted to cooperate with a belt and connected to said hub to be rotatable about said axis (A), an elastic spiral device interposed between the hub and the pulley and including a sliding portion elastically loaded in a radial direction against a sliding wall carried by one of the hub or pulley thereby forming a radially directed drive force coupling the pulley to the hub, wherein the elastic spiral device further includes a supporting portion having first and second, angularly spaced apart runner devices attached thereto which will apply radial loads to, slide along and be in direct contact with said sliding wall, the elastic spiral device having a leading end with the first runner device being attached to said leading end, the first runner device further including a narrowed leading end, said pulley assembly further including a pair of spaced apart abutting elements fixed to the sliding wall which will receive the narrowed leading end there between be contacted by the first runner device at a stopped position with respect to said sliding wall.

2. The pulley assembly according to claim 1, wherein said elastic spiral device is rotationally connected to said hub.

3. The pulley assembly according to claim 1, wherein each of said first and second runner devices are arranged to move with said elastic spiral device and slide along said sliding wall, and include a covering wall radially interposed between said supporting portion and said sliding wall.

4. The pulley assembly according to claim 3, wherein said supporting portion has a back surface with a concave central segment, and said covering wall defines a convex surface shaped to couple with said concave central segment.

5. The pulley assembly according to claim 4, wherein said second runner device includes a pair of recesses formed on an inside surface and in a direction parallel to said axis (A) and said convex surface and accommodating side edges of said supporting portion.

6. The pulley assembly according to claim 4, wherein said elastic spiral device further includes a spiral portion connected to said sliding portion and said covering wall of said second runner device has a radial thickness that increases from said spiral portion towards said supporting portion.

7. The pulley assembly according to claim 3, wherein said first and second runner devices are co-moulded onto said supporting portion.

8. The pulley assembly according to claim 3, wherein said first and second runner devices are connected by an adhesive layer to said supporting portion.

9. The pulley assembly according to claim 1, wherein said first and second runner devices comprise a metallic structure.

10. The pulley assembly according to claim 9, wherein said first and second runner devices further comprise a layer arranged in contact with said sliding wall and made of a polymeric material, or a fibre-reinforced polymeric matrix composite material, or a friction material.

11. The pulley assembly according to claim 1, wherein said first and second runner devices comprise a pair of walls covering respective sides of said supporting portion.

12. The pulley assembly according to claim 1, wherein said pair of abutting elements include a damping device to slow down the rotational movement of said pulley with respect to said hub before impact with said pair of abutting elements.

13. The pulley assembly according to claim 12, wherein said damping device comprises an inclined surface element fixed onto said sliding wall and cooperating with said elastic spiral device to increase the radial load exerted thereby as said first runner device approaches said stopped position.

14. The pulley assembly according to claim 13, wherein said pair of abutting elements include a first and a second projection radially protruding from said sliding wall and defining a hollow area there between so that the narrowed leading end will enter into said hollow area to cooperate with said inclined surface element.

15. The pulley assembly according to claim 1, wherein said first and second runner devices define a first contact zone and a second contact zone, respectively, in which the contact pressure exchanged between said sliding portion and said sliding wall is concentrated.

16. The pulley assembly according to claim 15, wherein said sliding portion further comprises an intermediate portion radially spaced from said sliding wall and circumferentially interposed between said first and second contact zones.

17. The pulley assembly according to claim 16, wherein said first and second contact zones are spaced apart by an angle in the range from 150° to 210°.

18. The pulley assembly according to claim 17, wherein said first and second contact zones are spaced so that the contact pressure resultant is essentially null.

19. The pulley assembly according to claim 17, wherein said elastic spiral device comprises a plurality of angularly and equally spaced spiral springs.

20. The pulley assembly according to claim 17, wherein said sliding portion further includes a third contact zone circumferentially and equally spaced from said first and second contact zones.

21. The pulley assembly according to claim 1, wherein said hub is adapted to be fastened to a rotating member and a seismic mass is connected to said hub to define a dynamic torsional vibration damper.

22. The pulley assembly according to claim 21, wherein said seismic mass is connected to said hub by an elastomeric band.

* * * * *